US008056122B2

(12) United States Patent
Cho et al.

(10) Patent No.: US 8,056,122 B2
(45) Date of Patent: Nov. 8, 2011

(54) USER AUTHENTICATION METHOD AND SYSTEM USING USER'S E-MAIL ADDRESS AND HARDWARE INFORMATION

(75) Inventors: Ku Gon Cho, Goyang (KR); Ho Gab Kang, Seoul (KR); In Gee Kim, Seongnam (KR); Kyu Soo Kim, Anyang (KR)

(73) Assignee: Fasoo.com Co., Ltd., Seoul (KR)

( * ) Notice: Subject to any disclaimer, the term of this patent is extended or adjusted under 35 U.S.C. 154(b) by 1199 days.

(21) Appl. No.: 10/515,949

(22) PCT Filed: May 26, 2003

(86) PCT No.: PCT/KR03/01028
§ 371 (c)(1),
(2), (4) Date: Nov. 24, 2004

(87) PCT Pub. No.: WO03/100629
PCT Pub. Date: Dec. 4, 2003

(65) Prior Publication Data
US 2005/0165698 A1    Jul. 28, 2005

(30) Foreign Application Priority Data
May 25, 2002    (KR) .................. 10-2002-0029115

(51) Int. Cl.
G06F 7/04        (2006.01)
G06F 15/16       (2006.01)
G06F 17/30       (2006.01)
H04L 29/06       (2006.01)
(52) U.S. Cl. ................ 726/5; 713/154; 380/59
(58) Field of Classification Search .......... 726/2–7, 726/16–21, 26–30, 9; 713/150–152, 162, 713/168, 182, 183, 172, 185; 380/59
See application file for complete search history.

(56) References Cited

U.S. PATENT DOCUMENTS
5,608,387 A * 3/1997 Davies ................... 340/5.27
(Continued)

FOREIGN PATENT DOCUMENTS
JP        04-147361        5/1992
(Continued)

OTHER PUBLICATIONS
Dr. Uchiyama, "Study on Active Identification and Control Method for Access User", Japan Defense Agency, 2001, No. 15, pp. 409-414.
(Continued)

Primary Examiner — Nasser Moazzami
Assistant Examiner — Oscar Louie
(74) Attorney, Agent, or Firm — Gottlieb, Rackman & Reisman

(57) ABSTRACT

A user authentication method of authenticating a user on an on-line basis using a user's e-mail address and hardware information is provided. The user authentication method includes the steps of: transmitting a user's authentication client platform hardware information and e-mail address to an authentication server module through an authentication client module installed in the authentication client platform; and the authentication client module determining user authentication according to whether or not the e-mail address and hardware information received from the authentication server module is identical to user's e-mail address and hardware information stored in an authentication database. A user's authentication request and authentication is confirmed through an e-mail in the case that authentication fails in the primary authentication process. The user authentication method performs authentication by using a user's hardware information and e-mail address, their uniqueness of which is verified. Accordingly, since a user's password is not required, inconveniences of reissuing the user's password due to losing the same can be reduced.

11 Claims, 2 Drawing Sheets

U.S. PATENT DOCUMENTS

| | | | | |
|---|---|---|---|---|
| 5,684,951 | A * | 11/1997 | Goldman et al. | 726/6 |
| 5,768,132 | A | 6/1998 | Cordery et al. | |
| 6,049,785 | A | 4/2000 | Gifford | |
| 6,209,104 | B1 * | 3/2001 | Jalili | 726/18 |
| 6,246,769 | B1 * | 6/2001 | Kohut | 380/45 |
| 6,353,852 | B1 * | 3/2002 | Nestoriak et al. | 709/206 |
| 6,385,729 | B1 * | 5/2002 | DiGiorgio et al. | 726/9 |
| 6,393,484 | B1 * | 5/2002 | Massarani | 709/227 |
| 6,434,700 | B1 * | 8/2002 | Alonso et al. | 713/169 |
| 6,691,227 | B1 * | 2/2004 | Neves et al. | 713/162 |
| 6,701,522 | B1 * | 3/2004 | Rubin et al. | 717/178 |
| 6,874,090 | B2 * | 3/2005 | See et al. | 726/13 |
| 6,980,081 | B2 * | 12/2005 | Anderson | 340/5.53 |
| 7,039,949 | B2 * | 5/2006 | Cartmell et al. | 726/6 |
| 7,127,524 | B1 * | 10/2006 | Renda et al. | 709/245 |
| 7,240,364 | B1 * | 7/2007 | Branscomb et al. | 726/9 |
| 7,624,437 | B1 * | 11/2009 | Fagundo et al. | 726/15 |
| 2002/0023059 | A1 * | 2/2002 | Bari et al. | 705/76 |
| 2002/0032855 | A1 * | 3/2002 | Neves et al. | 713/154 |
| 2002/0040441 | A1 * | 4/2002 | See et al. | 713/202 |
| 2002/0055848 | A1 | 5/2002 | Jae et al. | |
| 2002/0143885 | A1 * | 10/2002 | Ross, Jr. | 709/207 |
| 2003/0210127 | A1 * | 11/2003 | Anderson | 340/5.27 |
| 2004/0117376 | A1 * | 6/2004 | Lavin et al. | 707/10 |
| 2004/0243832 | A1 * | 12/2004 | Wilf et al. | 713/200 |
| 2005/0268100 | A1 * | 12/2005 | Gasparini et al. | 713/170 |
| 2006/0020525 | A1 * | 1/2006 | Borelli et al. | 705/34 |
| 2006/0212407 | A1 * | 9/2006 | Lyon | 705/71 |

FOREIGN PATENT DOCUMENTS

| | | |
|---|---|---|
| JP | 2001-052068 | 2/2001 |
| JP | 2001-285285 | 10/2001 |
| JP | 2002-007343 | 1/2002 |
| JP | 2002-007345 | 1/2002 |
| JP | 2002-064483 | 2/2002 |
| JP | 2002-108779 | 4/2002 |
| JP | 2002-108871 | 4/2002 |
| JP | 2002-117006 | 4/2002 |
| WO | WO 00/75760 | 12/2000 |
| WO | WO 0075760 A1 * | 12/2000 |

OTHER PUBLICATIONS

Nikkei Electronics, "Secure Identification of Individual Terminal by Using a Serial Number and an Authentication Circuit", Nikkei Bus. Pub., Inc., 1999, pp. 105-109.

* cited by examiner

USER AUTHENTICATION METHOD AND SYSTEM USING USER'S E-MAIL ADDRESS AND HARDWARE INFORMATION

TECHNICAL FIELD

The present invention relates to a method of authenticating a user who intends to connect to a server on an on-line basis, and more particularly, to a user authentication method of allowing an authentication server module in a server to authenticate a user by using a user's e-mail address and information on hardware devices mounted on an authentication client platform.

BACKGROUND ART

With the advent of various kinds of on-line services targeting users who connect to the Internet, each and every service website uses a range of methods for user authentication. The most generalized authentication method is a method of requiring a user to input a user's identification (ID) and password when the user accesses a website to then perform a log-in operation, and checking whether the input ID and password are identical to user's existing established and registered ID and password, thereby performing user authentication.

However, when a user intends to join various websites and register as a member, by using his or her own identification (ID), he or she should change his or her own ID with a new ID and register as a member with the new ID if his or her own ID has been already registered by a different user.

Further, since each website frequently requires a string of different structures, for example, that an ID and a password be input with only alphabetical characters or only numbers, or only a mixture of alphabetical characters and numbers, at the time of subscribing for the website or performing a log-in operation, the user must inevitably register different IDs and passwords at each respective website.

As a result, it is not easy to decipher and input the appropriate registered ID and password at a website, among the many established and registered IDs and passwords. Also, since users forget infrequently used IDs and passwords at times, they must go through a very burdensome process of confirming their IDs and passwords to then perform a log-in operation.

Recently websites increasingly adopt users' e-mail addresses as their IDs, rather than a separate ID. However, since a separate password is still required, it is inconvenient for users when they lose and wish to alter their passwords.

An authentication method based on a public key infrastructure (PKI) which is a composite security system providing encryption and an electronic signature through a PKI algorithm does not require a user ID, and has merits in that it enables nearly perfect data security when encrypting and decrypting data since encryption and decryption differ from each other between the transmission and reception ends. However, since each user should manage his or her own password in the case of the PKI-based authentication method, he/she must receive authentication again at the time of having lost his or her password. In addition, it consumes much costs and time to construct a PKI-based authentication system, and it is difficult to manage issuance and cancellation authentications.

DISCLOSURE OF THE INVENTION

To solve the above problems, it is an object of the present invention to provide a user authentication method of authenticating a user by only using a user's e-mail address and hardware information of an authentication client platform, which are verified for their uniqueness, without needing to manage a plurality of differing IDs and passwords for different websites.

To accomplish the above object of the present invention, there is provided a user authentication method of authenticating a user in an authentication server module using user's authentication client hardware information and e-mail address, the user authentication method comprising the steps of: downloading the authentication client module from the authentication server module and installing the same in a case that no authentication client module has been installed in a user's authentication client platform; said authentication client module transmitting the user's e-mail address and authentication client platform hardware information; and determining user authentication according to whether or not the e-mail address and hardware information received from the authentication server module is identical to user's e-mail address and hardware information stored in an authentication database.

Preferably, the user authentication method further comprises the steps of: said authentication server module transmitting a confirmation e-mail to the user in a case where an e-mail address which is identical to the received e-mail address does not exist in the authentication database; said user transmitting an identifier of the user's e-mail address and the hardware information of the authentication client platform, using the received confirmation e-mail; and said authentication server module recognizing the identifier of the e-mail as a response e-mail for the confirmation e-mail transmitted to the user, storing the user's hardware information in the authentication database, and performing user authentication registration.

Also, it is preferable that the confirmation e-mail is made up of a message written in a hypertext markup language (HTML), and thus, if the message is clicked, the e-mail identifier and the user's hardware information are transmitted to the authentication server module.

Also, it is preferable that the confirmation e-mail is attached with an execution file, and thus, after the confirmation e-mail has been transmitted to a user and then the attached execution file is executed by the user, the e-mail identifier and the user's authentication client platform hardware information are transmitted to the authentication server.

Also, it is preferable that if a plurality of pieces of hardware information for the user's authentication client platform are searched and displayed by the authentication client module, the corresponding hardware information is selected or determined as a higher priority sequence by the user.

Also, it is preferable that a user can receive authentication for a plurality of authentication client platforms from the authentication server module according to a server operator's policy.

Also, it is preferable that the hardware information is an inherent identification symbol which is permanently input for each device when being manufactured by a hardware manufacturer in which the inherent identification symbol cannot be changed unduly, and which can be recognized by a software program readable in the authentication client module.

Also, the authentication client platform can transmit and receive an e-mail via a network.

BRIEF DESCRIPTION OF THE DRAWINGS

The above and other objects and advantages of the present invention will become more apparent by describing in detail the preferred embodiment thereof with reference to the accompanying drawings in which.

BEST MODE FOR CARRYING OUT THE INVENTION

A preferred embodiment of the present invention will be described in detail with reference to the accompanying drawings.

Figure 1:
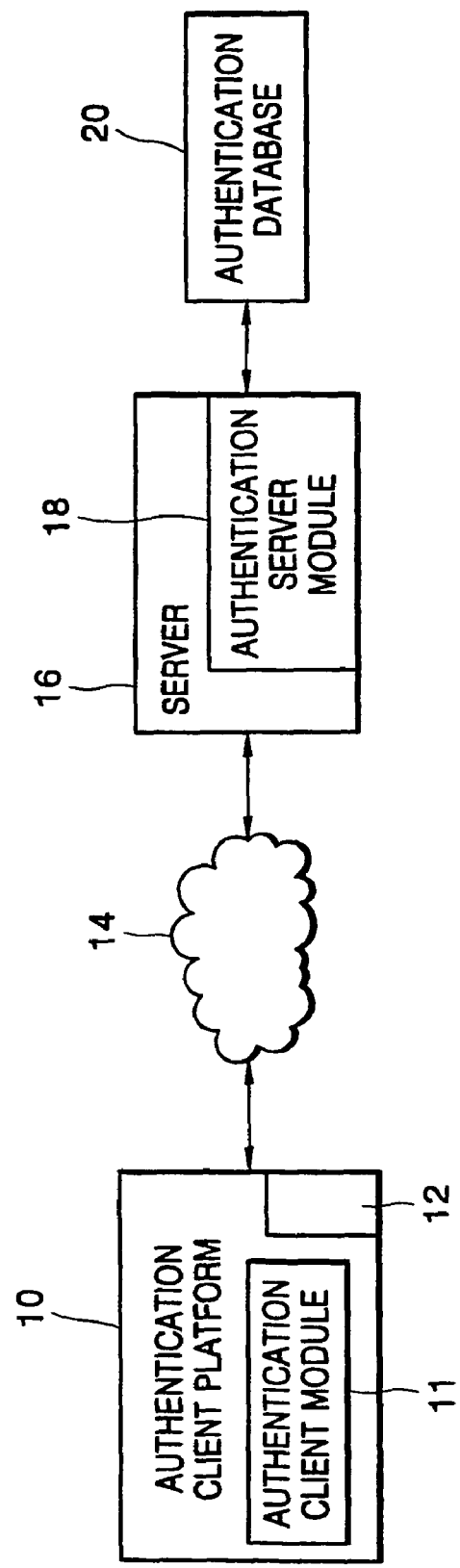
FIG. 1 is a block diagram showing a network system for explaining a user authentication method according to the present invention.
Figure 2:
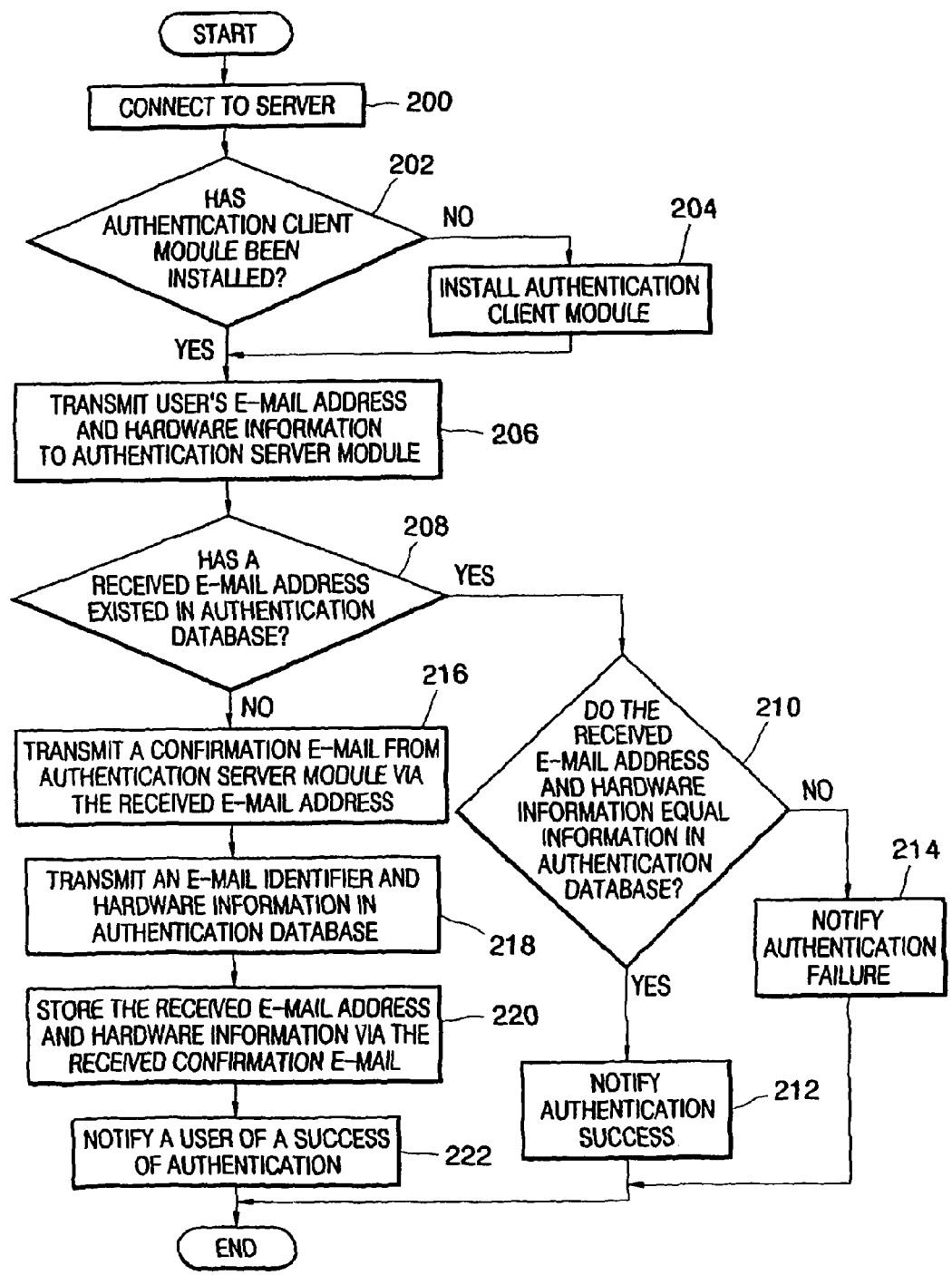
FIG. 2 is a flowchart view for illustrating a user authentication method according to the present invention.

As shown in FIGS. 1 and 2, a user connects to a server 16 via a network 14, for example, a private network or the Internet, using an e-mail transmission and reception device, for example, an authentication client platform 10 such as a personal computer (PC), a personal digital assistant (PDA), a cellular phone, and a web-television (web-TV) (step 200). Then, an authentication server module 18 contained in the server 16 checks whether an authentication client module is installed in the authentication client platform 10 (step 202). If no authentication client module 11 is installed in the user's authentication client platform 10, an authentication client module 11 is downloaded from the authentication server module 18 to the user's authentication client platform 10, and then the authentication client module 11 is installed in the user's authentication client platform 10 (step 204). The installed authentication client module 11 searches for hardware devices 12 mounted in the authentication client platform 10, for example, a central processing unit (CPU), a local area network (LAN) card, a hard disc drive, a smart card, and a memory stick, and then hardware information is displayed on a screen of the authentication client platform 10. Here, hardware information is an inherent identification symbol which is permanently input for each device when being manufactured by a hardware manufacturer which manufactures a hardware device 12 mounted in the authentication client platform 10 in which the inherent identification symbol cannot be changed unduly, and which can be recognized by a software program readable by the authentication client module 11. Also, if a plurality of pieces of hardware information for the user's authentication client platform 10 are searched and displayed by the authentication client module 11, the corresponding hardware information is selected or determined as a higher priority sequence by the user. When a user selects hardware information and then inputs his/her e-mail address, the authentication client module 11 transmits the user's selected hardware information and e-mail address to the authentication server module 18 of the corresponding server 16 (step 206).

Here, when a user inputs hardware information and an e-mail address through an unshown input unit contained in the authentication client platform 10, the input e-mail address is recorded as a particular file or registry in the authentication client platform 10. Thus, when the user connects to the corresponding server 16 at a later time, the stored user's e-mail address is read and then displayed on an unshown display by the authentication client module 11. In a case where a plurality of pieces of hardware information are displayed, the user selects particular information and then inputs the selected information.

The authentication server module 18 checks whether a user's e-mail address exists in an authentication database 20 (step 208). When the corresponding e-mail address and the received hardware information are identical to the e-mail address and the hardware information stored in the authentication database 20, an authentication completion message is transmitted to the user (steps 210 and 212). Meanwhile, when the former is not identical to the latter, user authentication is not allowed and then a message that the user authentication has been disallowed is transmitted to the user (step 214).

Meanwhile, if an e-mail address transmitted from the user does not exist in the authentication database 20, the authentication server module 18 judges that the currently connected user is not a registered person that has undergone authentication, and transmits a confirmation e-mail to an e-mail address received from the user (step 218). The confirmation e-mail is an e-mail address written in a language, such as HTML, and is provided with a portion on a message screen which can be clicked. Thus, if a user clicks the portion, an e-mail identifier and hardware information of a user's authentication client platform are transmitted to the server 16. In this case, the authentication server module 18 receives the user's hardware information from the verified e-mail address to thus perform authentication (step 222).

Also, a confirmation e-mail transmitted from the authentication server module 18 may not be an e-mail address written in HTML. In other words, if an execution file attached to an e-mail is transmitted to a user, the user executes the received attached execution file and transmits an e-mail identifier and hardware information of a user's authentication client platform to the server 16.

Here, the authentication server module 18 can confirm that an e-mail transmitted from a user is a corresponding user's response e-mail for a confirmation e-mail transmitted from the authentication server module 18.

Meanwhile, although not illustrated in FIG. 2, instead of the authentication server module 18 immediately notifying the user that an authentication is not allowed in a case where the received hardware information differs from the hardware information registered in correspondence to the user's e-mail address, it can provide a method of allowing a user to change the existing hardware information into new hardware information according to a user's request in a case where a user of an e-mail address that is received upon the request of authentication is identified through a confirmation e-mail according to an authentication policy of a website.

That is, in a case where the received hardware information is not identical to the registered hardware information, the authentication server module 18 transmits a confirmation e-mail to an e-mail address of a corresponding user according to a user authentication policy, to thereby re-confirm whether or not a user is authenticated, and can change hardware information according to a request of the user having the corresponding e-mail address in a case where the user has been authenticated and registered.

The authentication server module 18 can allow the user to add hardware information for corresponding authentication client platforms to a predetermined limited number of authentication client platforms in an authentication method using the hardware information, by taking into consideration that user uses different authentication client platforms at the office or home. In this case, since a confirmation e-mail transmitted from the authentication server is received at a user's e-mail address which is used as an actual user's ID and undergoes an authentication process although the user's authentication client platform has been changed, reliability for user authentication can be enhanced.

Also, a portable and simple hardware device which is mounted in a user's authentication client platform, and thus registered as hardware information in an authentication database 20, for example, a smart card in an authentication client platform where a memory stick or a card reader is mounted, is mounted in a different authentication client platform, to thus connect to a corresponding website to receive authentication without changing the user's hardware information stored in the authentication database.

INDUSTRIAL APPLICABILITY

As described above, the authentication method according to the present invention uses user's hardware information and a user's e-mail address, their uniqueness of which is verified so as to remove any risk of overlap of different user's IDs. Therefore, a situation in which a user inevitably needs to change his/her ID since his/her ID is overlapped with a different user's ID whenever he/she is authenticated and registered at a website does not exist.

Also, since a user does not need to input a password during authentication, there is no burden from losing his/her password. Also, a webserver can reduce management costs, such as reissuance process caused by losing one's password.

The present invention is not limited to the above-described embodiment. It is apparent to one who is skilled in the art that there are many variations and modifications that can be made without departing from the spirit of the present invention and the scope of the appended claims.

What is claimed is:

1. A user authentication method of authenticating a user in an authentication server module installed in a server, said module using information specifically indicative of the user's hardware platform and the user's e-mail address, the user authentication method comprising the steps of:

Determining whether an authentication client module including a hardware identification symbol uniquely identifying the hardware is present on the user' hardware, said authentication client module reading said identification symbol and storing it in said user's authentication platform;

if an authentication client module is not present, sending an authentication client module from the authentication server module to a user's authentication platform for installation in said user's authentication platform, said user's authentication platform including a hardware having a hardware identification symbol that uniquely identifies said hardware and being readable by said authentication client module, said authentication client module reading said identification symbol;

said server obtaining the user's e-mail address and said hardware identification symbol as the user's ID from said authentication client module;

determining a user authentication by said authentication server module in said server according to whether or not the e-mail address and hardware identification symbol obtained from the authentication server module is identical to a user's e-mail address and hardware identification symbol stored in an authentication database;

said authentication server module transmitting a confirmation e-mail to a user in the case that an e-mail address which is identical to the received e-mail address does not exist in the authentication database;

said server receiving from said user an identifier of the user's e-mail address and the hardware identification symbol in response to said confirmation e-mail; and said authentication server module recognizing the identifier of the e-mail as a response e-mail for the confirmation e-mail transmitted to the user, storing the hardware identification symbol in the authentication database, and performing user authentication registration, wherein the confirmation e-mail is made up of a message written in hypertext markup language (HTML):

activating said message and causing the e-mail address and the hardware identification symbol to be transmitted to the authentication server module.

2. The user authentication method of claim 1, wherein the confirmation e-mail is attached with an execution file, wherein when execution file is executed at the user's authentication platform, the user's e-mail address and the hardware identification symbol are transmitted to the authentication server.

3. The user authentication method of claim 1, wherein a user is associated with several user authentication platforms related to the same user e-mail address, further comprising storing authentication platform information for each said authentication platform in said authentication database and generating an authentication when the user's e-mail is received from any one of said user's authentication platforms.

4. The user authentication method of claim 1, wherein the hardware identification symbol is an inherent identification symbol which is permanently input for each hardware device when being manufactured by a hardware manufacturer in which the inherent identification symbol cannot be changed.

5. The user authentication method of claim 1, wherein the user's authentication platform can transmit and receive e-mail via a network.

6. The user authentication method of claim 1 wherein the user is identified and authenticated only from the user's email address and hardware identification symbol.

7. The method of claim 1 wherein said user authentication platform includes several hardware devices, each device having a unique hardware identification symbol, further comprising detecting said hardware identification symbols by said client authentication module, receiving an input command from the user designating one of said hardware identification symbols and storing said selected authentication symbol in said user platform.

8. A system comprising a server communicating with a user platform over a communication channel, wherein said user platform is controlled by a user who has an e-mail address and said platform including a hardware indicator indicative of the hardware of a device within the platform, and said server including a platform authentication module reading said hardware indicator; wherein said server is associated with a database including a stored e-mail address and a stored hardware indicator;

said server obtaining the user's e-mail address and said hardware indicator from said user platform; and determining user authentication by said authentication server module in said server by comparing the user e-mail address and hardware indicator with the stored e-mail address and stored hardware identification and providing an authentication signal when the comparison indicates a match;

wherein said user authentication platform includes several hardware devices, each device having a unique hardware indicator symbol, further comprising detecting said hardware identification symbols by said client authentication module, receiving an input command from the user designating one of said hardware indicator symbols and storing said selected authentication symbol in said user platform.

9. The system of claim 8 said server determining if said user platform includes said platform authentication module and if said platform authentication module is not found then said server downloading to said user platform said platform authentication module, said platform authentication model then obtaining said hardware indicator and storing said hardware identification on said platform.

10. The system of claim 8 wherein said server communicates with a plurality of user platforms, each user platform being associated with the same user and having the same user e-mail address.

11. The system of claim 10 wherein said database includes several stored hardware indicator sets, all indicator sets being associated with a single user e-mail address.

* * * * *